J. O. CLAY.
Steam Cooking Apparatus.
No. 97,048.            Patented Nov. 23, 1869.
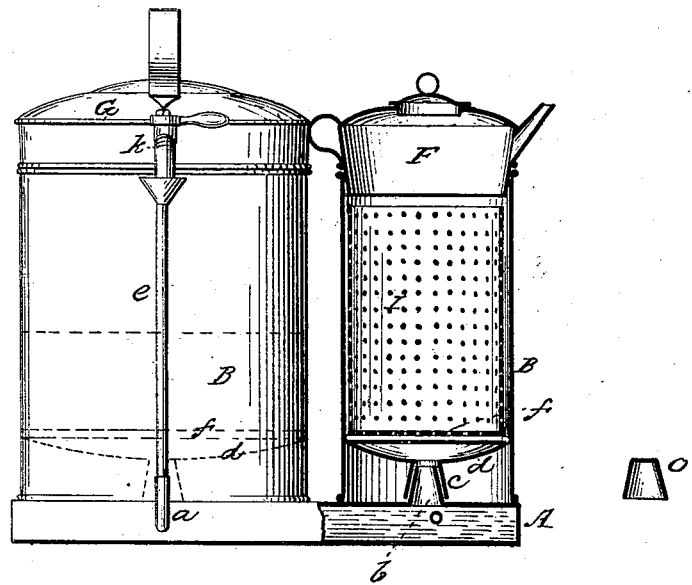
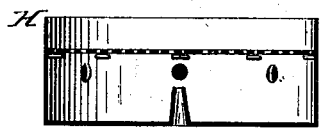
WITNESSES:
E. J. Sommer
Phil. T. Dodge
INVENTOR:
J. O. Clay
by Dodge & Munn
his attys

United States Patent Office.

JAMES O. CLAY, OF HUDSON, WISCONSIN.

Letters Patent No. 97,048, dated November 23, 1869.

STEAM COOKING-APPARATUS.

The Schedule referred to in these Letters Patent and making part of the same

*To all whom it may concern:*

Be it known that I, JAMES O. CLAY, of Hudson, in the county of St. Croix, and State of Wisconsin, have invented certain new and useful Improvements in Steam Cooking-Apparatus; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improved apparatus for cooking by steam; and

It consists in a novel manner of constructing a steam-generator, to be placed upon an ordinary cooking-stove, and also, in an improved manner of constructing vessels to fit upon and receive steam from the said generator, and in which the articles to be cooked are placed.

In the drawing—

Figure 1 is a front view of my improved apparatus, a portion being broken away, to show clearly the interior arrangement.

Figure 2 is a sectional view of one of the vessels to contain the articles to be cooked.

A is the steam-generator, a shallow sheet-metal box, made of a size and shape to correspond with the top of the stove, and provided on one side with the pipe *a*, and on the top with any desired number of short conical tubes *b*.

The number and location of the tubes *b* may be varied as found desirable.

B B are the vessels to contain the vegetables, meats, &c., and are made of various sizes and shapes, but all constructed with bottoms *d*, secured above the bottom of the body, these bottoms being dished or depressed on the upper side, and provided on the under side with short flaring tube *c*, of a size to fit tightly upon the tubes *b*.

Within the vessels B, I place metal frames *f*, resting upon the bottoms *b*, to sustain articles placed in the vessel, and prevent choking of the openings in their bottoms.

The vessels B, I place on the generator, placing the tubes *c* over the tubes *b* on the generator, as clearly shown in fig. 1, thus conducting the steam from the generator into the vessels B.

When any of the tubes *b* are not in use, they are closed by caps *o*, provided for the purpose, one of the caps being shown on the drawing detached.

To the pipe *a*, I connect an upright pipe, *e*, terminating in a funnel-shaped mouth, as shown in fig. 1.

On the vessel B, nearest the pipe *e*, I place a water-vessel, G, provided on one side with a cock, *k*, through which heated water is drawn off for use, or which, when the vessel is turned around in the proper position, will discharge into the pipe *e*, and thus supply the generator.

The articles to be cooked I place in the vessels B, either directly upon the grate *f*, or in a vessel which is placed on the grate.

These removable vessels to contain the food, I make of various forms and sizes, adapted for different varieties of food, and the several methods of cooking them.

They may be made of wire gauze or perforated metal, similar to that shown at I, fig. 1, to admit steam from all sides through or among the contents; or of the form of an ordinary pan or pail, open only at the top; or of the form shown in fig. 2, which admits the passage of steam up through the centre, without allowing the escape of liquids contained in it; or closed vessels may be used, so as to heat the articles without subjecting them to the direct action of the steam.

Coffee or tea-pots may be made to fit the top of the vessels B, as shown at F, fig. 1, thus allowing the coffee or tea to be thoroughly steeped, but not allowing it to be brought to or above the boiling-point, an object to attain which many expensive devices have been invented.

When any of the vessels B are not closed by kettles or other vessels, a tightly-fitting cover is placed over them.

In using my apparatus, the generator is partially filled with water, and then placed flat on top of the stove, and such of the vessels B as are required are placed in position on it, and the tubes *b* that are not in use are then closed by caps *o*.

The articles to be cooked are then placed in the vessels B, and the tops closed, either by a cover or by setting another vessel on top, as shown in fig. 1.

The steam generated in A passes up, through the tubes *b*, into the vessels B, and there coming in contact with the food, or with the dishes containing the same, quickly and thoroughly cooks it.

As the steam condenses, the water resultant therefrom falls to the bottom of the vessels B, and flows back, through the pipes *b*, into the generator A.

As the water in the generator boils away, it may be replenished by turning the cock *k*, and allowing hot water from vessel G to flow down pipe *e*, this pipe entering the generator below the water-line, so that steam cannot escape through it.

By this method of construction I obtain a very large heating-surface, to which a thin sheet of water is exposed, and, as a consequence, produce a very rapid steam-generator.

The pipe *e* and vessel G, with its cock, being arranged as described, the generator can be fed with water already partially heated, and this without removing any of the vessels or dishes.

In my apparatus the different articles may be placed in separate and isolated vessels. One article may not become impregnated with the flavor of another, as happens where the various articles are placed in a common vessel, or where a series of communicating vessels is placed one above another.

Having thus described my invention,

What I claim, is—

1. A steam-generator, for cooking-purposes, consisting of a reservoir or base, A, so constructed as to set flat on the top of a stove, and provided with tubes $b$, for conveying steam to the cooking-vessels, and for holding the latter in place, substantially as described.

2. The cooking-vessels B, provided with the concave bottoms $d$, with tube $c$ attached, substantially as and for the purpose set forth.

3. The combination of the generator A and the water-supply vessel G, when constructed and arranged to operate substantially as described.

JAMES O. CLAY.

Witnesses:
 JNO. S. MOFFAT,
 S. CURTIS SIMONDS.